United States Patent [19]

Clavenna et al.

[11] 4,060,500
[45] Nov. 29, 1977

[54] PREPARATION OF MIXED METAL OXIDES BY DECOMPOSITION OF CARBONATE SOLID SOLUTIONS HAVING THE CALCITE STRUCTURE

[75] Inventors: LeRoy R. Clavenna, Baytown, Tex.; John M. Longo, New Providence; Harold S. Horowitz, Clark, both of N.J.

[73] Assignee: Exxon Research and Engineering Company, Linden, N.J.

[21] Appl. No.: 684,744

[22] Filed: May 10, 1976

[51] Int. Cl.$^2$ .................. B01J 23/04; B01J 23/06; B01J 23/34; B01J 23/84
[52] U.S. Cl. .................. 252/471; 252/447; 252/455 R; 252/455 Z; 252/457; 252/459; 252/463; 252/466 J
[58] Field of Search .............. 252/471, 62.51 R, 593, 252/599, 447, 455 R, 455 Z, 466 J, 457, 459, 463

[56] References Cited

U.S. PATENT DOCUMENTS

| | | | |
|---|---|---|---|
| 3,039,965 | 6/1962 | Swoboda | 252/62.51 |
| 3,897,367 | 7/1975 | Lauder | 252/462 |

*Primary Examiner*—W. J. Shine
*Attorney, Agent, or Firm*—Joseph J. Allocca

[57] ABSTRACT

A process for the preparation of high surface area mixed metal oxides by decomposition of solid solutions of carbonates possessing the calcite structure. Oxide compounds comprising mixtures of Ca, Mn, Fe, Co, Ni, Zn, Cd and Mg can be prepared by this method. For example, $CaMnO_3$ with a surface area of 11 m$^2$/g useful as a battery cathode, has been prepared by the instant method, that is, by decomposition of a $CaMn(CO_3)_2$ precursor.

The mixed metal carbonate solid solutions which are used as precursors for the preparation of the mixed metal oxides are themselves prepared by the precipitation from solution of the appropriate metal ions by the addition of an excess of a carbonate ion source (such as $(NH_4)_2CO_3$). The metal-ion ratio in this solution is adjusted so that the resulting precipitate has the same stoichiometry as the desired oxide. The intimate mixing achieved by using the carbonate precipitation technique allows calcination to metal oxide to be run at lower temperatures for shorter periods of time, thereby achieving higher surface areas.

45 Claims, 1 Drawing Figure

PREPARATION OF MIXED METAL OXIDES BY DECOMPOSITION OF CARBONATE SOLID SOLUTIONS HAVING THE CALCITE STRUCTURE

FIELD OF THE INVENTION

The instant invention is a process for the preparation of high surface area mixed metal oxides by decomposition of solid solutions of carbonates which have the calcite structure. Oxide compounds comprising mixtures of Ca, Mn, Fe, Co, Mg, Ni, Zn and Cd can be formed by this method, for example, $CaMnO_3$ with a surface area of 11 $m^2/g$ useful as a battery cathode has been prepared by the instant method.

The mixed metal carbonate solid solutions which are used as precursors for the preparation of the mixed metal oxides are themselves prepared by the precipitation from solution of the appropriate metal ions by the addition of an excess of a carbonate source such as $(NH_4)_2CO_3$ or $Na_2CO_3$). The metal ion ratio in this solution is adjusted so that the precipitate has the same stoichiometry as the desired oxide. The intimate mixing achieved by using the carbonate precipitation technique allows the calcination to metal oxide to be run at lower temperatures for shorter periods of time thereby achieving higher surface areas.

BACKGROUND OF THE INVENTION

Mixed metal oxides represent a large class of materials with many important properties not found in the more limited binary oxides. Mixed metal oxides can stabilize high oxidation states of transition elements, have extensive ranges of either anion or cation nonstoichiometry and provide new structural arrangements such as found in the perovskite, spinel or pyrochlore structures. These features made mixed metal oxides useful for applications such as electrocatalysts, heterogeneous catalysts and battery cathodes.

This flexible class of compounds is limited in application because of the difficulties involved in the preparation of high surface area materials. The usual route to these compounds provides low surface area material because it involves reaction at high temperature for long periods of time to overcome the diffusional limitations of compound formation.

The traditional ceramic approach to these complex metal oxides involves repeated high temperature firing of the component oxides with frequent regrindings. This harsh treatment is necessary to otain a single phase product because of the diffusional limitation of reaction even between fine particles of $10\mu$ size (100,000 A). Initial reaction is rapid but further reaction goes more and more slowly as product builds up and diffusion paths become longer. The use of freeze drying or coprecipitation improves reactivity of the component oxides because these techniques give initial particles of $0.05\mu$ (500 A) that are well mixed. But 500 A particles mean that diffusion must still occur across more than 50 unit cells, because each of these particles has the composition of one of the component oxides. To achieve the fastest, most complete reaction in the shortest time would require the mixing of the components of an atomic scale.

German Patent 1,342,020 discloses a method for preparing catalysts and catalyst carriers consisting of metal oxides, of metals and metal oxides or of metals and/or metal oxides and carrier which contain the component(s) in a very finely divided and difficultly recrystallizable form. Such catalysts may be advantageously produced by a process which comprises mixing at least two metal salts in aqueous solution in a given proportion and precipitating basic carbonates having the general formula $A_6B_2(OH)_{16}(CO_3)\cdot 4H_2O$ by means of an aqueous solution of an alkali bicarbonate at a temperature of from 50° to 100° C, drying the resulting precipitate and calcining, or calcining and reducing the dried product to obtain high surface area metal oxides. However, their system is limited and specific to basic carbonates (i.e. containing hydroxides) that are hydrated and of the formula given above. In that formula, A is a small divalent cation and B is a trivalent cation. Both the A and B site can be occupied by any fraction of different cations as long as the divalent ones (A) represent 75% of all cation sites and the trivalent ones represent 25% of all cation sites.

By comparison, the instant specification discloses a process for the preparation of high surface area mixed metal oxides which involves the precipitation of pure carbonate (only $CO_3^=$ ions) and not a basic carbonate, the precursor of the instant invention does not contain any waters of hydration (whereas German 1,342,020 does so), there is only one type of cation site in the instant carbonate precursor ($ACO_3$) (a divalent cation), no trivalent cations as in German 1,342,020, and the precursor of the instant specification is able to accommodate large cations such as Ca, and Cd while German 1,342,020 is limited to smaller cations. From this it is clear that the precursors of the instant specification are in every way different than those of the prior art (in the basic carbonates of the German Patent).

U.S. Pat. No. 2,275,181 to Ipatieff and Corson teaches the preparation of catalysts by the coprecipitation of copper carbonate or copper hydroxide with a hydroxide of zinc or iron by the addition of ammonium carbonate solution to a solution containing the desired proportions of the nitrates of copper and of the desired promoter metal (zinc or iron). The precipitate obtained is calcined at from 350°–450° in air and then reduced in $H_2$ at 175°–200° C. The use of copper operates against the formation of a carbonate possessing the calcite structure and, therefore, renders impossible the very specific structure necessary to obtain the compounds possessing the specific inter atomic distances and distributions which are unique characteristics of compounds prepared by the instant process.

U.S. Pat. No. 3,303,001 to Dienes also teaches a copper-zinc catalyst. The catalyst is prepared by the coprecipitation of copper and zinc as the carbonates from an aqueous solution of their soluble salts through double decomposition reaction with sodium carbonate. Again, the procedure results in a carbonate which does not possess the calcite structure (since copper is incapable of entering a crystal lattice possessing the calcite configuration). The copper carbonate precipitates out as a separate crystalline phase and does not enter into the same intimate relationship as do the metals outlined in the instant specification. This behavior by the copper in forming a separate phase is designated as coprecipitation technique and clearly is not the solid solution of the instant invention.

Comparative Data: Cu/Zn System

Theoretical crystal chemistry considerations dictate that Cu and Zn cannot form a solid solution carbonate structure. Experimental evidence supports this. The procedure set forth in Example 1 of U.S. Pat. No.

3,303,001 for the coprecipitation of Cu and Zn carbonates was followed. X-ray diffraction of the resulting precipitate showed it to be multiphase consisting of a $Cu_2(OH)_2(CO_3)$-type phase, a $Zn_4CO_3(OH)_6·H_2O$-type phase, and possibly a third $(Zn,Cu)_5(CO_3)_2(OH)_6$-type phase. Reaction of this precipitate at 370° C for 3 hours (also according to the procedure described in the patent) resulted in the formation of two distinct phases, CuO and ZnO; thus, the procedure described by this patent does not promote reaction between the oxides of the constituent cations.

U.S. Pat. No. 3,701,739 to Bovarnich et al, teaches the preparation of a heterogeneous catalyst by decomposing and dehydrating an ammoniacal solution of a mixture of the carbonate or hydroxide of at least one reducible metal and one nonreducible metal. The patent teaches as equivalent Na, Co, Fe, Cu, Mo, W, Ag and Rh and indicates that one or more of these metal carbonates or hydroxides dissolved in ammonium hydroxide is to be added to an ammonium hydroxide solution of Al, Cd, Zn, Ti, Zr and Si carbonate or hydroxide, to yield a solution which when decomposed and dehydrated results in a catalytic oxide. Clearly, the process does not teach the use of a carbonate precipitation technique and more importantly it does not indicate the critical nature of the calcite structure which is the key and essential element of the instant invention. The patent teaches a process which results in a mixed phase product and not a solid solution carbonate of the calcite structure as taught by the invention of the instant specification.

U.S. Pat. No. 3,039,965 to Swoboda is directed to $CoMnO_x$ and $NiMnO_x$ compounds and methods of preparing them. The compositions are preapred by heating at 450°-800° C in the presence of $O_2$ a mixture of a manganese salt with a nickel and/or cobalt salt, cooling the mass and separating from the mass an ilmenite-type ferromagnetic complex oxide of Mn with Ni and/or Co. The heating is carried out by gradually heating the mixture up to a temperature of 450° to 800° C. The salts which may be admixed are selected from the group consisting of nitrates, oxalates, halides and carbonates. This patent teaches by example that when a nickel salt is mixed with a manganese salt in an aqueous solution and then precipitated as a carbonate by addition of sodium carbonate which is followed by heating at from 640°-700° C for 5 hours in the presence of oxygen, a magnetic powder results which is a mixed phase, a major phase of $NiMnO_3$ with minor phases of NiO and $Mn_2O_3$. Theoretical crystal chemistry considerations would lead one to expect that it is possible to prepare, by the process described, single phase solid solution calcite precipitates of Ni plus Mn which could be decomposed into a single phase mixed metal oxide. The result in the case of Ni and Mn on its face would tend to teach away from the process of the instant specification as a method for the preparation of single phase mixed metal oxide materials by means of the decomposition of single phase solid solution calcite structure carbonate precursors. Experiments conducted to determine what was occurring led to examination of the Mn-Ni precipitate which is obtained by following the procedure of U.S. Pat. No. 3,039,965. Such examination revealed that the precipitate was not a single phase calcite structure material but a precipitate consisting of $MnCO_3$ with a calcite structure and amorphous $NiCO_3$.

By the practice of the method of the instant invention, however, compounds of higher surface areas are prepared and this is the result of the use of calcite structure single phase solid solution precursors as starting material.

THE PRESENT INVENTION

Figure 1:
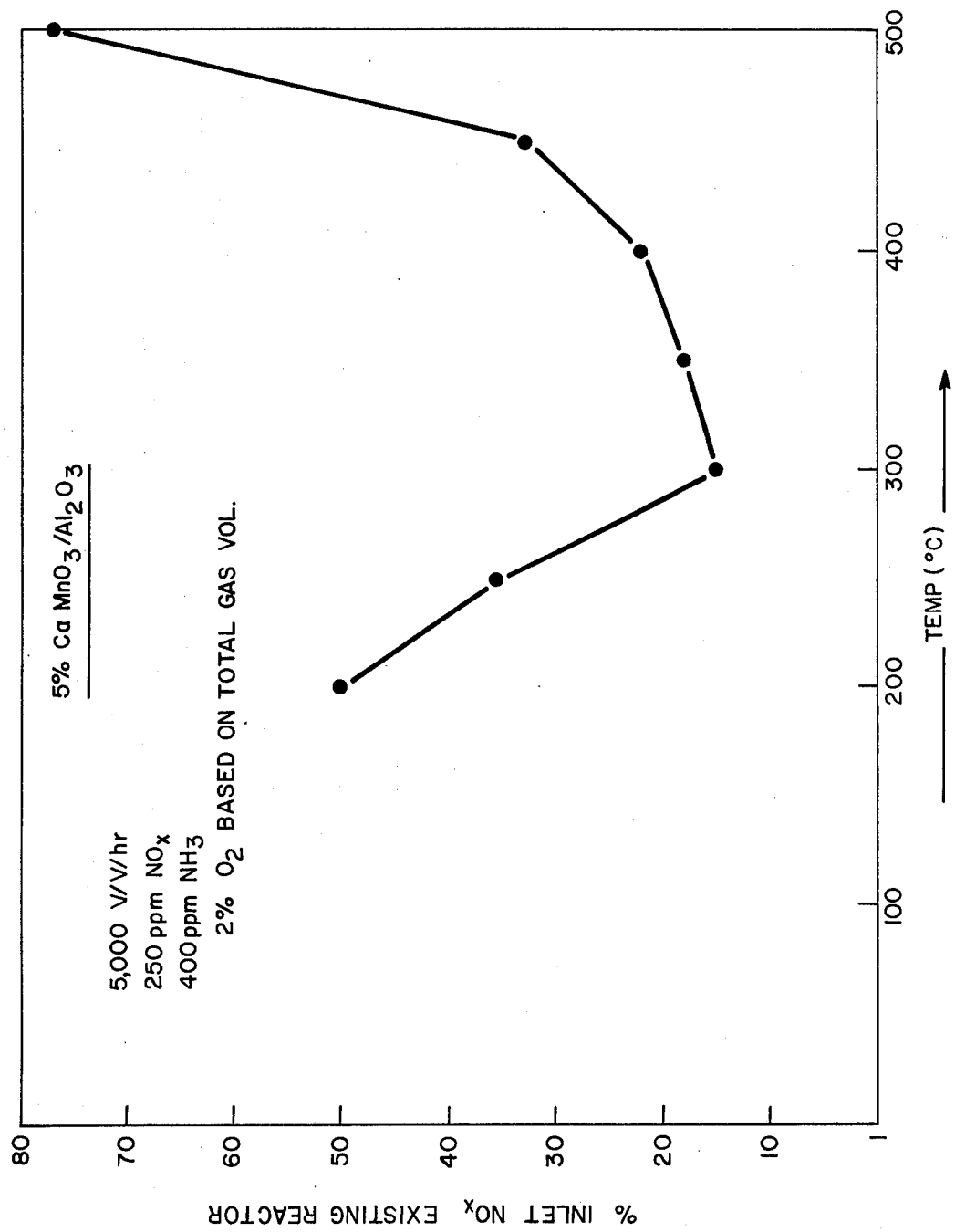
FIG. 1 shows the reduction of $NO_x$ by ammonia in the presence of a $CaMnO_3$ on alumina catalyst.

A solid solution is the interpenetration, on an atomic scale (~10 A), of two chemically different but structurally similar lattices. The limits of solubility of one solid in another is determined by the relative size of the ions and their electrical charge. It is similar to alloy formation between metals except in the instant case, one is dealing with ionic crystal structures.

After forming a solid solution carbonate precursor, it can rapidly be decomposed under oxidizing conditions to the oxide. The cations are already mixed on an atomic scale in the single phase precursor so that decomposition is rapid and complete with mixed metal oxide formation taking place at significantly lower temperatures and shorter times. By this method, it is possible to go from a situation where the reaction cations are 100,000 A apart ($10\mu$ particles) to one where the cations are 10 A apart.

In the Ca-Mn-O system, for example, the preparation of the perovskite, $CaMnO_3$, by standard solid state reaction requires heating the component oxides at 1300° C for days with frequent regrinding. This compounds finds application as a battery cathode but the high temperature route gives material with only 0.2 $m^2/g$ and therefore a limited rate of discharge. It has been found that carbonate compounds of calcium and manganese with the calcite structure, i.e. $[CaMn(CO_3)_2]$ can be prepared and then decomposed under the proper conditions to give significantly higher surface area perovskite. For the solid solution with the calcite structure, heating in air at 900° C for one-half hour gives $CaMnO_3$ with a surface area of 11 $m^2/g$.

A recent patent, U.S. 3,395,027, revealed that materials such as $CaMnO_3$ and $Ca_{(1-x-z)}MnO_3Na_xY_z$ are useful as oxygen adsorption/reduction low cost electrocatalyst for use in gas electrodes which contain a hydrophilic layer. This patent goes on to state that $CaMnO_3$ is particularly useful but suffers from the disadvantage of being produced as relatively large particles with low surface area, whereas high surface area manganites are highly desirable. The patent does not disclose or intimate what method can be used to generate high surface area manganites, just that such materials are desirable. The instant specification describes an invention which constitutes a process whereby high surface area manganites, indeed, many high surface mixed metal oxides can be produced by utilizing the solid solution precursor method. As revealed by U.S. Pat. No. 3,395,027, such high surface area $CaMnO_3$ is useful in gas electrodes, indeed would be the material of choice if it could be produced. The instant invention teaches a method for producing this and other related materials.

The fully reacted perovskite related $Ca_2MnO_4$ has been prepared with a surface area of 17 $m^2/g$ by reacting the solid solution, single phase precipitate, $Ca_2Mn(CO_3)_3$ at 800° C in air for 15 minutes. Standard solid state reaction of the same compound from the component carbonates (1300° C for several days with frequent regrindings) gives a surface area of only 0.8 $m^2/g$.

The compound $Cd_2Mn_3O_8$ has been prepared at 500° C for one hour in $O_2$ from the solid solution single phase precipitate $Cd_2Mn_3(CO_3)_5$ to give a surface area of 98 m²/g. Table I following, constitutes a comparison of the surface areas of mixed metal oxides prepared by the solid solution precursor techniques of the instant invention and materials of similar formula prepared by techniques of the prior art.

TABLE I

Surface Areas: Comparative Data

| | Surface Area | |
|---|---|---|
| | Solid Solution Precursor Technique | Conventional Solid State Reaction Technique |
| $CaMnO_3$ | 11 m²/g | 0.2 m²/g |
| $Ca_2MnO_4$ | 17 m²/g | 0.58 m²/g (0.6) |
| $Cd_2Mn_3O_8$ | 98 m²/g | 2.8 m²/g |

The instant invention constitutes a method for preparing high surface area mixed metal oxides by means of single phase mixed metal carbonate solid solution precursor having a calcite structure. Mixed metal carbonate solid solution precursors of the formulae:

$Ca_{(a)}Fe(II)_{(b)}Co(II)_{(c)}Zn_{(d)}$
$Cd_{(e)}Mg_{(f)}Mn(II)_{(g)}(CO_3)_Z$ and
$Ca_{(a)}Fe(II)_{(b)}Co(II)_{(c)}Ni(II)_{(d)}$
$Zn_{(e)}Cd_{(f)}Mg_{(g)}(CO_3)_Z$ wherein in both cases, Z is 1, $a$ to $g$ are decimals ranging from 0 to <1 with a minimum when the metal cation is present at all of 0.01 and $(a+b+c+d+e+f+g) = 1$ are prepared by dissolving individual metal salts, such as carbonate, sulfates, nitrates or acetates, preferably carbonates in water to give metal salt solutions, the only requirement being that when the two metal salt solutions are subsequently mixed (as described below) they do not result in formation of a spontaneous precipitate, and further that when mixed with the carbonate ion source, no competing precipitate is formed, i.e. only calcite structure carbonates result. When necessary, the metal salts may be dissolved in dilute aqueous acid solutions, preferably dilute aqueous $HNO_3$, the acid solutions being just strong enough to cause the metal salt to go into solution, such as $HNO_3$, $H_2SO_4$, $CH_3CO_2H$ or HCl. Two or more such aqueous individual metal salt solutions are mixed together in appropriate molar amounts so when contacted with the precipitating solution will yield a precipitate having the metal in molar ratio of the desired end product. The mixing is accomplished at any convenient temperature, the lower limit being selected such that it does not exceed the solubility of the solutes for each solution, the upper limit being about 150° F. Preferably, the solutions are mixed at ambient (i.e. room) temperature. This multi metal solution is then contacted with a source of carbonate ion which causes the precipitation of a mixed metal carbonate solid solution. The mixing and contacting steps may be conducted at any convenient temperature, the only proviso being that the solutions remain liquid. The source of carbonate ion may be ammonium carbonate, sodium carbonate, potassium carbonate or gaseous $CO_2$ but preferably is ammonium carbonate.

The mixed metal carbonate solid solution is then separated, preferably by filtration from the parent liquor. The carbonate is used to prepare high surface area mixed metal oxides of the formulae:

$Ca_{(a)}Fe_{(b)}Co_{(c)}Zn_{(d)}Cd_{(e)}Mg_{(f)}Mn_{(g)}[O]_Q$ and $Ca_{(a)}Fe_{(b)}Co_{(c)}Ni_{(d)}Zn_{(e)}Cd_{(f)}Mg_{(g)}[O]_Q$ wherein in both cases, Q is 1, $a$ to $g$ are decimals ranging from 0 to <1 with a minimum when the metal cation is present at all of 0.01 and wherein the sum of the products of each cation subscript times its respective cation valence = 2Q by taking the isolated mixed metal carbonate solid solution precursor having the calcite structure fired for a time sufficient and at a preselected temperature of up to 900° C to yield the desired high surface area mixed metal oxide. Alternatively, the heating may be conducted by subjecting the carbonate to a gradual temperature increase, i.e. gradual heating, provided an excessively low heating rate is avoided (rates less than 2° C/min are to be avoided). The oxides formed have surface areas greater than 5 m²/g and as high as 100 m²/g and more. The metal cations of the carbonate precursor are arranged in a repeating fashion to form the calcite lattice structure. The cation arrangement demonstrates homogeneous distribution in the lattice, having interatomic separation distances ranging from 9 A to ~ 12 A depending on the metal-metal ion pairs involved.

Mixed Metal Oxide Formation Using the Solid Solution Calcite Precursor

Solution 1 consists of an aqueous solution of appropriate molar amounts of the metal ions desired. It can be prepared by dissolving the individual carbonates, nitrates, acetates, sulfates or any other form of the cations which will form an aqueous solution (but usually carbonates) in a weakly acidic solution such as $HNO_3$, $H_2SO_4$, $HC_2H_3O_2$, HCl (but usually $HNO_3$) or any other acid which will dissolve the appropriate cation sources in aqueous solution. The only other restriction on the cation source materials and on the acid used is that the anions involved must be such that they do not form an insoluble product with the cation of the carbonate precipitating solution.

The solution may be of any convenient concentration, usually between 2 4 M, the only critical factor being the necessity that the final solution have the metal ions in correct stoichiometry to achieve the desired end product. There is no restriction to making solution I as dilute as desired, except for the decreasing yield of precipitate. Alternatively, the solutions can be made as concentrated as the solubility limit of the solvent chosen permits.

An acidic solution may not be necessary if the cation source materials are soluble in water. For example, an aqueous solution of Ca and Mn ions could be prepared simply by dissolving $Ca(NO_3)_2$ and $Mn(NO_3)_2 \cdot 4H_2O$ in water. In summary, the pH of the aqueous solution should be adjusted to a value such that the desired level of solubility of the appropriate cations is achieved. Typically, the pH of the starting mixed carbonate solution must be acidic and ranges from pH of 1 to 5, most preferably it is pH 2. This multi metal ion aqueous solution is then added with stirring to an approximately 2 M solution of $(NM_4)_2CO_3$ (range 1 M - 10 M) having a volume 2 to 4 times the volume of the aqueous solution of metal cations. The exact amount of $(NH_4)_2CO_3$ used is calculated to be at least 3 times the amount theoretically necessary to precipitate all of the metal cations in solution. Other carbonate solutions such as $Na_2CO_3$ or $K_2CO_3$ could be used as precipitating agents although $(NH_4)_2CO_3$ is preferred. The resulting mixed metal solid solution, single phase precipitate is vacuum filtered and dried to constant weight. The drying is done either in a vacuum drying oven, an inert atmosphere drying oven or for short periods of time in a microwave oven, taking care that the precipitate is not subjected to high temperatures in the presence of oxygen causing any divalent transition metal cation incorporated in the precipitate to be oxidized. To further prevent premature oxidation, the precipitates are usually stored in a nitrogen atmosphere.

The solid solution carbonate precursors can then be reacted to the mixed metal oxide by firing the single phase carbonates, usually in air, oxygen, oxygen saturated with $H_2O$ or air saturated with $H_2O$ at temperatures ranging from 300° to 900° C depending on the composition of the mixed metal oxide, and firing for times ranging from 15 minutes to 200 hours, preferably 15 minutes to 24 hours, most preferably, 30 minutes to 2 hours.

The mixed metal oxides as revealed above, can also be prepared in the presence of suitable inert supports such as inert refractory oxides (i.e. alumina, silica, aluminasilicates, zeolites) or carbon so as to result in a supported mixed metal oxide.

The support of choice is first soaked in a solution of the salts of the desired mixed metal components, then soaked in a solution of an appropriate carbonate source precipitating agent such as $(NH_4)_2CO_3$, $Na_2CO_3$, $K_2CO_3$, etc. The resulting mixed metal carbonate on the support is then oxidized in an appropriate atmosphere (air, $O_2$, $O_2$ saturated with $H_2O$ or air saturated with $H_2O$) at a temperature ranging from 300°–900° C depending on the composition of the mixed metal oxide and fired for times ranging from 15 minutes to 200 hours, preferably 15 minutes to 24 hours, most preferably, 30 minutes to 2 hours. In this way, supported mixed metal oxides are conveniently prepared.

EXAMPLE 1

Synthesis of $CaMnO_3$ using the solid solution calcite precursor $CaMn(CO_3)_2$.

The first step involves the purification of reagent grade $MnCO_3$ which contains an appreciable amount of Mn oxidized above the $Mn^{+2}$ state causing the carbonate to have a brown color rather than the white color it should have. The procedure is as follows:

110 gms. reagent grade $MnCO_3$ are stirred into 500 ml. distilled $H_2O$. Dilute $HNO_3$ is added with stirring until the evolution of $CO_2$ ceases (this should coincide with the pH of the solution going just acidic as monitored by pH indicating paper). Most of the $MnCO_3$ goes into solution. The oxidized portion, however, forms a brown precipitate which is then separated by filtering the solution through filter paper into a vacuum flask. The filtration of the solution is usually repeated a second time to ensure that all the contaminant is removed.

The purified solution is then poured with stirring into 1500 ml of a 1.83 M solution of $(NH_4)_2CO_3$.

The precipitate is then separated from the aqueous phase by vacuum filtration and dried in a microwave oven to constant weight. The purified $MnCO_3$, which is white in color, is stored in a $N_2$ atmosphere. 105 gms. are recovered.

$CaMn(CO_3)_2$ Precipitation: The following solutions are prepared:
Solution 1: .2470 moles $CaCO_3$ (24.7214 g)
.2470 moles purified $MnCO_3$ (28.3900 g) dissolved in 200 ml. distilled $H_2O$ plus sufficient dilute $HNO_3$ to effect complete solution. Usually a slight amount of brown precipitate will form (presumably a slight bit of $MnCO_3$ has oxidized to yield this contaminant) and the solution is filtered to remove this precipitate. Normally the amount of this precipitate is so slight as to make a determination of its weight impossible.

Solution 2: 1.93 moles $(NH_4)_2CO_3$ dissolved in 900 ml. distilled $H_2O$

Solution 1 is added to solution 2 with stirring over approximately 2 minutes. The precipitate is then separated from the aqueous phase by vacuum filtration. The precipitate is dried to constant weight in a microwave oven and stored in a nitrogen atmosphere. The yield of the single phase carbonate precipitate is essentially quantitative.

The resulting precipitate, when X-rayed, yields a pattern characteristic of the calcite structure whose lattice parameter is half-way between the lattice parameters of $MnCO_3$ and $CaCO_3$. When fired for 30 minutes to 2 hours at 800°–900° C, the precipitate will yield fully reacted perovskite, $CaMnO_3$, with a surface area of 9–11 $m^2/g$.

Example 2

Synthesis of $Ca_2MnO_4$ using the solid solution calcite precursor $Ca_2Mn(CO_3)_3$.

The following solutions are prepared:
Solution 1: 0.2000 moles $CaCO_3$ (20.018 g)
0.1000 moles $MnCO_3$ (11.496 g) dissolved in 100 ml. distilled $H_2O$ plus sufficient dilute $HNO_3$ to effect complete solution and end evolution of $CO_2$.
Solution 2: .8327 moles $(NH_4)_2CO_3$ (80.0000 g) dissolved in 500 ml. distilled $H_2O$.

Solution 1 is added to solution 2 with stirring over approximately 2 minutes. The precipitate is then separated from the aqueous phase by vacuum filtration. The precipitate is dried overnight at 60° C in a vacuum drying oven with a nitrogen bleed.

The resulting single phase, solid solution precursor, $Ca_2Mn(CO_3)_3$, can be fired for 15 minutes at 800° C in air to give the fully reacted $Ca_2MnO_4$ with a surface area of 17 $m^2/g$.

The Ca:Mn cation ratio of a $Ca_xMn_{1-x}(CO_3)$ precipitate can be varied from $x=0$ to $x=1$ without restriction since $CaCO_3$ and $MnCO_3$ are iso-structural and form a single phase solid solution over the entire composition range defined by $x=0$ to $x=1$.

Surface areas of calcite precursors:

The surface areas of the solid solution calcite precursors as prepared by the precipitation technique described, range, in the case of $Ca_{0.5}Mn_{0.5}CO_3$, from 9–74 $m^2/g$ with the average surface area being 25–30 $m^2/g$. The surface area of this precipitate can be varied by minor adjustments in the precipitation procedure. A specific example follows:

1. $Ca_{0.5}Mn_{0.5}CO_3$ precipitated and dried as described in the previously mentioned procedure; S.A. = 9.3 $m^2/g$.
2. $Ca_{0.5}Mn_{0.5}CO_3$ precipitated, given an additional thorough rinse in distilled $H_2O$ and then dried; S.A. = 31.91 $M^2/g$.
3. $Ca_{0.5}Mn_{0.5}CO_3$ precipitated, given an additional thorough rinse in isopropyl alcohol and then dried; S.A. = 26.20 $m^2/g$.
4. $Ca_{0.5}Mn_{0.5}CO_3$ precipitated, given a thorough rinse in distilled $H_2O$, followed by a thorough rinse in isopropyl alcohol and then dried; S.A. = 74.3 m²/g.

In continuous solid solutions of ionic salts, which includes the carbonates whose preparation is being described, the lattice parameter of the solid solution is directly proportional to the atomic percent solute present. This relationship, known as Vegard's law, is fairly closely adhered to by the solid solutions of carbonates being described and provides a convenient method for checking the composition of a single phase precipitate by measuring the lattice parameter. The ability to quickly monitor the composition of the precipitate in this manner is important since the ratio of one type of cation to the other in the precipitate does not always coincide with the ratio of these cations present in the original aqueous solution. The discrepancy in composition from aqueous solution to precipitate can be quite large in some systems such as $CdCO_3$ - $MnCO_3$. The following example describes the preparation of the solid solution precipitate $Cd_2Mn_3(CO_3)_5$ which requires that a ratio of 1:2 Cd:Mn be used in the aqueous solution.

EXAMPLE 3

Synthesis of $Cd_2Mn_3O_8$ using the solid solution calcite precursor $Cd_2Mn_3(CO_3)_5$.

The following solutions are prepared:

Solution 1: 0750 moles $CdCO_3$ (12.939 g)

.1500 moles purified $MnCO_3$ (17.249 g) dissolved in 100 ml distilled $H_2O$ plus sufficient dilute $HNO_3$ to effect complete solution.

Solution 2: .536 moles $(NH_4)_2CO_3$ dissolved in 250 ml. distilled $H_2O$

Solution 1 is added to solution 2 with stirring over approximately 2 minutes. The precipitate is then separated from the aqueous phase by vacuum filtration. The precipitate is dried to constant weight in a microwave oven and stored in a nitrogen atmosphere to prevent premature oxidation.

The resulting $Cd_2Mn_3(CO_3)_5$ solid solution, single phase precipitate can be converted to the fully reacted mixed metal oxide $Cd_2Mn_3O_8$ with a surface area of 98 m²/g by firing the precipitate in $O_2$ for 1 hour at 500° C.

Following the procedures outlined in Examples 1 through 3, a series of solid solution, carbonate, single phase precipitates, some of which are listed in Table II were prepared. The solid solutions were characterized by X-ray diffraction and the d-values of their major peaks are listed. The corresponding data for the end member carbonates ($CaCO_3$, $MnCO_3$, and $CdCO_3$) are also included for comparison.

Description of Table II: X-ray Diffraction Data

The Table consists of seven columns: one column for each of the major X-ray diffraction peaks in the carbonate X-ray patterns. Each peak in the X-ray pattern corresponds to a specific set of crystallographic planes, and each of these sets of crystallographic planes are identified by Miller indices. The columns of Table II have been labelled by the Miller indices corresponding to the major X-ray diffraction peaks. The numbers in each column represent the interplanar distance, in Angstroms, of that set of crystallographic planes identified at the top of the column.

In continuous solid solutions of crystalline, ionic salts (such as the (Ca/Mn) $CO_3$ and (Cd/Mn) $CO_3$ systems), the interplanar distances should be directly proportional to the atomic percent solute present. For example, the interplanar distance for the (104) family of planes (first column, Table II) for the solid solution $Ca_{.50}Mn_{.50}CO_3$ should fall halfway between the (104) interplanar distances of $CaCO_3$ ($d_{104}$ = 3.03 A) and $MnCO_3$ ($d_{104}$ = 2.85 A). The entry for $d_{104}$ of $CaMn(CO_3)_2$ shows that the experimentally determined spacing is $d_{104}$ = 2.94 A which does fall exactly halfway between the two end members. Observation of the tabulated data in Table II shows that the interplanar spacings of each family of crystallographic planes varies in a predictable way with composition. As more and more of the larger $Ca^{2+}$ (ionic radius = 0.99 A) are replaced by the smaller $Mn^{2+}$ (ionic radius = 0.80 A) the interplanar spacings decrease in a linear fashion.

Table II also shows that the interplanar spacings vary in a similar manner for the Cd/Mn calcite system. As more and more of the larger $Cd^{2+}$ (ionic radius = 0.97 A) are replaced by the smaller $Mn^{2+}$ the interplanar spacings decrease accordingly.

Likewise, the interplanar spacings of the Co/Mn calcite system vary in a similar fashion with the interplanar spacings increasing continuously as $Mn^{2+}$ is gradually substituted for $Co^{2+}$. Clearly, then, mixed metal oxide compounds of the formula $Co_{(c)}Mn_{(g)}[O]_Q$ wherein Q is 1, c and g are decimals ranging from 0.01 to <1 and wherein (c) times the valence of Co plus g times the valence of Mn equals 2(Q) can be prepared by the process of the instant invention.

Table II

| Compound | (hkl) | | | | | | |
|---|---|---|---|---|---|---|---|
| | (104) | (012) | (113) | (202) | (110) | (116) | (024) |
| $CaCO_3$ | 3.03 | 3.85 | 2.27 | 2.09 | 2.49 | 1.87 | 1.90 |
| $[Ca_{.67}Mn_{.33}]CO_3$ | 2.99 | 3.80 | 2.25 | 2.07 | 2.46 | 1.84 | 1.89 |
| $[Ca_{.60}Mn_{.40}]CO_3$ | 2.97 | 3.77 | 2.24 | 2.05 | 2.45 | 1.84 | 1.86 |
| $[Ca_{.60}Mn_{.50}]CO_3$ | 2.94 | 3.75 | 2.23 | 2.05 | 2.44 | 1.83 | 1.86 |
| $[Ca_{.29}Mn_{.71}]CO_3$ | 2.91 | 3.74 | 2.21 | 2.03 | 2.43 | 1.81 | 1.86 |
| $[Ca_{.25}Mn_{.75}]CO_3$ | 2.90 | 3.71 | 2.21 | 2.03 | 2.42 | 1.80 | 1.86 |
| $[Ca_{.20}Mn_{.80}]CO_3$ | 2.90 | 3.71 | 2.20 | 2.02 | 2.42 | 1.79 | 1.86 |
| $[Ca_{.125}Mn_{.875}]CO_3$ | 2.88 | 3.70 | 2.19 | 2.01 | 2.41 | 1.78 | 1.85 |
| $[Ca_{.08}Mn_{.92}]CO_3$ | 2.87 | 3.70 | 2.19 | 2.01 | 2.40 | 1.78 | 1.84 |
| $MnCO_3$ | 2.85 | 3.67 | 2.17 | 2.00 | 2.40 | 1.77 | 1.83 |
| $[Cd_{.11}Mn_{.89}]CO_3$ | 2.86 | 3.67 | 2.19 | 2.01 | 2.40 | 1.77 | 1.84 |
| $[Cd_{.125}Mn_{.875}]CO_3$ | 2.87 | 3.70 | 2.19 | 2.01 | 2.40 | 1.78 | 1.84 |
| $[Cd_{.33}Mn_{.67}]CO_3$ | 2.88 | 3.71 | 2.19 | 2.02 | 2.42 | 1.79 | 1.85 |
| $[Cd_{.50}Mn_{.50}]CO_3$ | 2.91 | 3.74 | 2.21 | 2.04 | 2.43 | 1.81 | 1.87 |
| $CdCO_3$ | 2.94 | 3.80 | 2.25 | 2.07 | 2.46 | 1.84 | 1.89 |
| $CoCO_3$ | 2.74 | 3.55 | 2.11 | 1.95 | 2.33 | 1.70 | 1.78 |
| $[Co_{.67}Mn_{.33}]CO_3$ | 2.80 | 3.61 | 2.15 | 1.99 | 2.37 | 1.75 | 1.81 |
| $[Co_{.40}Mn_{.60}]CO_3$ | 2.83 | 3.65 | 2.16 | 1.99 | 2.38 | 1.75 | 1.82 |
| $MnCO_3$ | 2.85 | 3.67 | 2.17 | 2.00 | 2.40 | 1.77 | 1.83 |

A wide range of applications is envisioned for the high surface area mixed metal oxides whose preparation has been described.

$CaMnO_3$, prepared from the solid solution precursor, has been successfully discharged as a primary battery cathode and recharged as a secondary cathode in a KOH electrolyte. The high surface area of this material (11 m²/g) permits a reasonable rate of discharge, whereas in the conventionally solid state reacted $CaMnO_3$ (0.2 m²/g) the system is limited with respect to discharge rate. Other high surface area mixed metal oxides prepared by the solid solution precursor technique which stabilize high valence states of mixed valence are useful as battery cathodes. This especially applies to oxides which stabilize all of the electrochemically active cations in their normally highest valence states in the solid state (i.e., all $Mn^{+4}$ ions as $CaMn^{+4}O_3$, $Ca_2Mn^{+4}O_4$ and $Cd_2Mn_3^{+4}O_8$).

Most mixed metal oxides containing cations capable of occupying mixed valence states can exist over a wide range of nonstoichiometry. This feature along with the ability to synthesize stoichiometric mixed metal oxide compounds which stabilize a range of valence states make these materials useful catalysts in reactions involving oxygen-containing molecules (i.e. $NO_x$ reduction, Hydrocracking, methanol decomposition and oxygen reduction at a fuel cell cathode). Again, for effective catalysts, a high surface area is needed to maximize the number of active sites and this can be accomplished with the solid solution precursor. $C_aMnO_3$ has activity as an $NO_x$ reduction catalyst. In order to test the material on an inert support, the solid solution precursor technique can be modified to directly deposit the precipitate on alumina, a typical catalyst support, as illustrated in the following example:

EXAMPLE 4

Preparation of supported $CaMnO_3$ by the solid solution percursor technique.

Solutions 1 and 2 as described in Example 1 are prepared. Thirty grams of porous alumina extrudates are placed in a beaker and then submerged in solution 1 for 5 minutes. The solution is then decanted off and the pellets are next submerged in solution 2 for 5 minutes. This solution is then decanted and the pellets with the deposited layer of single phase, solid solution carbonate are dried in nitrogen overnight. The pellets are then fired for 30 minutes at 900° C in $O_2$ to give high surface area $CaMnO_3$ supported in alumina extrudates.

An additional application of the solid solution precursor technique relates to its ability to give high surface area refractory mixed metal oxides which can be sintered to high density. Achieving complete densification of refractory oxides is a common problem in ceramic technology and it is dependent on homogenous, high surface area (i.e. highly reactive) starting materials. The solid solution, single phase precipitates with their mixing on an atomic scale and high surface area fills these requirements.

EXAMPLE 5

$CaMnO_3$ as $NO_x$ reduction catalyst.

As already described, an approximately 5% (by weight) $CaMnO_3$ supported on 1/8' alumina extrudates was prepared. A simulated flue gas of 250 ppm NO and 2% oxygen with balance $N_2$ was run through a bed of catalyst (5% $CaMnO_3/Al_2O_3$). Ammonia (400 ppm) was added to the gas steam as a reductant for $NO_x$. The hourly space velocity was 5000 and the NO in the exit gas was monitored by an electrochemical process.

The results of these experiments are plotted in FIG. 1, which plots % of inlet NO present in the exhaust vs. the temperature of the sample. It is clear from the experiment that $CaMnO_3$ is an active catalyst for the reduction of $NO_x$ by $NH_3$.

For purposes of comparison,, attempts have been made to synthesize $CaMnO_3$ by usual coprecipitation techniques.

EXAMPLE A

Coprecipitation of Ca and Mn oxalates.
Solution 1: Equal molar amounts of Ca and Mn acetate dissolved in dilute acetic acid with gentle heating.
Solution 2: Oxalic acid.

Solution 1 is added to solution 2 yielding a white precipitate. The precipitate is separated by vacuum filtration and dried in a microwave oven.

The above precipitate is fired for one hour at 800° C in air resulting in a product consisting of $Ca_2MnO_4$, CaO, $Mn_3O_4$ plus an unidentified phase. This result demonstrates that complete reaction is not achieved in short times at low temperatures for this coprecipitation technique. Furthermore, when the precipitate is fired for 40 hours at 1300° C in air, the resulting products are $Ca_2MnO_4$ and CaO demonstrating that Mn oxalate has an appreciable solubility in oxalic acid relative to Ca oxalate. This would make substantial corrections of the original Ca:Mn batch ratio necessary in order to achieve a desired Ca:Mn ratio in the final product.

EXAMPLE B

Coprecipitation of Ca and Mn Hydroxides.
Solution 1: 3 gms $CaMn(CO_3)_2$ dissolved in 25 ml $H_2O$ and sufficient $HNO_3$ to make solution clear and slightly acidic.
Solution 2: 150 ml $H_2O$
50 ml $NH_4OH$ Solution 1 is added to solution 2 yielding a precipitate which is a gummy mass, brown in color. The precipitate is dried in a microwave for 4 minutes at which time it is still gummy and wet (not the consistency of a high surface area precipitate).

The precipitate is then fired for 30 min. at 900° C in $O_2$. The product consists of $Mn_2O_3$, $Mn_3O_4$ and an unidentified phase. There is no trace of any Ca-containing compounds. When filtered for 16 hours at 1300° C in air, the precipitate yields a product of $Mn_3O_4$.

Conclusion: Ca has a much higher solubility than Mn in $NH_4OH$ solution and so this method of preparation is unsuitable for Ca/Mn compounds.

What is claimed is:

1. A method for the preparation of mixed metal oxides of the formula:

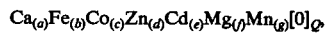

wherein Q is 1, a to g are decimals ranging from 0 to <1 with a minimum, when the metal cation is present at all of 0.01 and wherein the sum of the products of each cation subscript times the respective cation valence equals 2(Q), which method comprises the steps of:
   1. dissolving individual metal salts in water to give metal salt solutions;
   2. mixing 2 or more of the metal salt solutions of (1) in appropriate molar amounts, provided they do not result in formation of a spontaneous precipitate, to give a solution which when contacted with a source of carbonate ions will yield only a single phase calcite structure carbonate precipitate having the metal ion stoichiometry desired in the final product;
   3. mixing the solution of step (2) with a source of carbonate ions thereby yielding a single phase mixed metal carbonate solid solution precipitate having a calcite structure;
   4. separating the precipitate from the solution;
   5. firing the isolated precipitate under oxidizing conditions for a time at a temperature of from 300° to 900° C thereby yielding the mixed metal oxide.

2. A method for the preparation of mixed metal oxides of the formula:

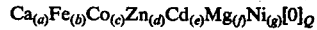

wherein Q is 1, $a$ to $g$ are decimals ranging from 0 to <1 with a minimum when the metal cation is present at all of 0.01 and wherein the sum of the products of each cation subscript times the respective cation valence equals 2(Q), which method comprises the steps of:
   1. dissolving individual metal salts in water to give metal salt solutions;

2. mixing 2 or more of the metal salt solutions of (1) in appropriate molar amounts, provided they do not result in formation of a spontaneous precipitate, to give a solution which when contacted with a source of carbonate ions will yield only a single phase calcite structure carbonate precipitate having the metal ion stoichiometry desired in the final product;
3. mixing the solution of step (2) with a source of carbonate ion thereby yielding a single phase mixed metal carbonate solid solution precipitate having a calcite structure;
4. separating the precipitate from the solution;
5. firing the isolated precipitate under oxidizing conditions for a time at a temperature of from 300° to 900° C thereby yielding the mixed metal oxide.

3. The method according to claim 1 for the preparation of mixed metal oxides wherein the mixed metal oxide is of the formula:

$$Ca_{(a)}Mn_{(g)}[O]_Q$$

wherein Q is 1, $a$ and $g$ are decimals ranging from 0.01 to $<1$ and wherein $a$ times the valence of Ca plus $g$ times the valence of Mn equals 2(Q) and wherein the metal salts dissolved in water in step (1) are Ca metal salts and Mn metal salts.

4. The method according to claim 1 for the preparation of mixed metal oxides wherein the mixed metal oxide is of the formula:

$$Cd_{(e)}Mn_{(g)}[O]_Q$$

wherein Q is 1, $e$ and $g$ are decimals ranging from 0.01 to $<1$ and wherein $e$ times the valence of Cd plus $g$ times the valence of Mn equals 2(Q) and wherein the metal salts dissolved in water in step (1) are Cd metal salts and Mn metal salts.

5. The method according to claim 1 for the preparation of mixed metal oxides wherein the mixed metal oxide is of the formula:

$$Co_{(c)}Mn_{(g)}[O]_Q$$

wherein Q is 1, $c$ and $g$ are decimals ranging from 0.01 to $<1$ and wherein $c$ times the valence of Co plus $g$ times the valence of Mn equals 2(Q) and wherein the metal salts dissolved in water in step (1) are Co metal salts and Mn metal salts.

6. The method of claim 1 wherein step (1) is further characterized in that the individual metal salts are dissolved in acid solutions to yield solution (1), provided that the anions of the acid do not form an insoluble product with the cation of the carbonate precipitating solution.

7. The method of claim 6 wherein the acid solutions have a pH of about 1 to about 5.

8. The method of claim 7 wherein the acid solution is selected from the group consisting of aqueous solutions of HNO$_3$, H$_2$SO$_4$, CH$_3$CO$_2$H and HCl.

9. The method of claim 8 wherein the acid solution is dilute aqueous HNO$_3$.

10. The method of claim 1 wherein step (3) is further characterized in that the source of carbonate ions is selected from the group consisting of ammonium carbonate, sodium carbonate, potassium carbonate and gaseous CO$_2$.

11. The method of claim 10 wherein the source of carbonate is ammonium carbonate.

12. The method of claim 1 wherein the individual metal salts of step (1) are metal carbonates.

13. The method of claim 1 wherein the separation step constitutes filtering.

14. The method of claim 1 wherein the metal salts of step (1) which are dissolved in water are selected from the group consisting of carbonates, nitrates, acetates and sulfates.

15. The method of claim 2 wherein step (1) is further characterized in that the individual metal salts are dissolved in acid solutions to yield solution (1), provided that the anions of the acid do not form an insoluble product with the cation of the carbonate precipitating solution.

16. The method of claim 15 wherein the acid solutions have a pH of about 1 to about 5.

17. The method of claim 15 wherein the acid solution is selected from the group consisting of aqueous solutions of HNO$_3$, H$_2$SO$_4$, CH$_3$CO$_2$H and HCl.

18. The method of claim 17 wherein the acid solution is dilute aqueous HNO$_3$.

19. The method of claim 2 wherein step (3) is further characterized in that the source of carbonate ions is selected from the group consisting of ammonium carbonate, sodium carbonate, potassium carbonate and gaseous CO$_2$.

20. The method of claim 19 wherein the source of carbonate is ammonium carbonate.

21. The method of claim 2 wherein the individual metal salts of step (1) are metal carbonates.

22. The method of claim 2 wherein the separation step constitutes filtering.

23. The method of claim 2 wherein the metal salts of step (1) which are dissolved in water are selected from the group consisting of carbonates, nitrates, acetates and sulfates.

24. A method for the preparation of supported mixed metal oxides of the formula:

$$Ca_{(a)}Fe_{(b)}Co_{(c)}Zn_{(d)}Cd_{(e)}Mg_{(f)}Mn_{(g)}[O]_Q$$

wherein Q is 1, $a$ to $g$ are decimals ranging from 0 to $<1$ with a minimum when the metal cation is present at all of 0.01 and wherein the sum of the products of each cation subscript times the respective cation valence equals 2(Q), which method comprises the steps of:
1. dissolving individual metal salts in water to give metal salt solutions;
2. mixing 2 or more of the metal salt solutions of (1) in appropriate molar amounts, provided they do not result in formation of a spontaneous precipitate, to give a solution which when contacted with a precipitating solution will yield only a single phase calcite structure carbonate precipitate having the metal ion stoichiometry desired in the final product;
3. contacting an inert support material with the solution of (2) thereby resulting in a soaked support material;
4. separating the soaked support material of (3) from the excess solution of (2);
5. contacting the soaked support material of (4) with a source of carbonate ions thereby yielding a mixed metal carbonate calcite structure precipitate supported on an inert support material;

6. firing the supported mixed metal carbonate calcite structure precipitate of (5) under oxidizing conditions at a temperature of from 300° to 900° C thereby yielding the supported mixed metal oxide.

25. The method of claim 24 wherein the inert support material of step (3) is selected from the group consisting of alumina, silica, alumina-silicate zeolites and carbon.

26. A method for the preparation of supported mixed metal oxides of the formula:

$$Ca_{(a)}Fe_{(b)}Co_{(c)}Zn_{(d)}Cd_{(e)}Mg_{(f)}Ni_{(g)}[0]_Q$$

wherein Q is 1, a to g are decimals ranging from 0 to <1 with a minimum when the metal cation is present at all of 0.01 and wherein the sum of the products of each cation subscript times the respective cation valence equals 2(Q), which method comprises the steps of:

1. dissolving individual metal salts in water to give metal salt solutions;
2. mixing 2 or more of the metal salt solutions of (1) in appropriate molar amounts, provided they do not result in formation of a spontaneous precipitate, to give a solution which when contacted with a precipitating solution will yield only a single phase calcite structure carbonate precipitate having the metal ion stoichiometry desired in the final product;
3. contacting an inert support material with the solution of (2) thereby resulting in a soaked support material;
4. separating the soaked support material of (3) from the excess solution of (2);
5. contacting the soaked support material of (4) with a source of carbonate ions thereby yielding a mixed metal carbonate calcite structure precipitate supported on an inert support material;
6. firing the supported mixed metal carbonate calcite structure precipitate of (5) under oxidizing conditions at a temperature of from 300° to 900° C thereby yielding the supported mixed metal oxide.

27. The method of claim 26 wherein the inert support material of step (3) is selected from the group consisting of alumina, silica, zeolites and carbon.

28. The method of claim 24 wherein the metal salts of step (1) which are dissolved in water are selected from the group consisting of carbonates, sulfates, nitrates and acetates.

29. The method of claim 26 wherein the metal salts of step (1) which are dissolved in water are selected from the group consisting of carbonates, sulfates, nitrates and acetates.

30. The method of claim 24 wherein step (1) is further characterized in that the individual metal salts are dissolved in acid solutions to yield solution (1), provided that the anions of the acid do not form an insoluble product with the cation of the carbonate precipitating solution.

31. The method of claim 26 wherein step (1) further characterized in that the individual metal salts are dissolved in acid solutions to yield solution (1), provided that the anions of the acid do not form an insoluble product with the cation of the carbonate precipitating solution.

32. The method of claim 30 wherein the acid solutions have a pH of about 1 to about 5.

33. The method of claim 31 wherein the acid solutions have a pH of about 1 to about 5.

34. The method of claim 30 wherein the acid solution is selected from the group consisting of aqueous solutions of $HNO_3$, $H_2SO_4$, $CH_3CO_2H$ and HCl.

35. The method of claim 31 wherein the acid solution is selected from the group consisting of aqueous solutions of $HNO_3$, $H_2SO_4$, $CH_3CO_2H$ and HCl.

36. The method of claim 1 further characterized in that the dissolving step (1) and the mixing step (2) are practiced simultaneously.

37. The method of claim 2 further characterized in that the dissolving step (1) and the mixing step (2) are practiced simultaneously.

38. The method of claim 24 further characterized in that the dissolving step (1) and the mixing step (2) are practiced simultaneously.

39. The method of claim 26 further characterized in that the dissolving step (1) and the mixing step (2) are practiced simultaneously.

40. The method of claim 1 further characterized in that the separated precipitate of step (4) is washed with water, isopropyl alcohol or both, prior to the firing of step (5).

41. The method of claim 2 further characterized in that the separated precipitate of step (4) is washed with water, isopropyl alcohol or both, prior to the firing of step (5).

42. The method of claim 1 further characterized in that the separated precipitate of step (4) is dried prior to the firing of step (5).

43. The method of claim 2 further characterized in that the separated precipitate of step (4) is dried prior to the firing of step (5).

44. The method of claim 24 further characterized in that the mixed metal carbonate calcite structure precipitate supported on an inert support material of step (5) is dried prior to the fitting of step (6).

45. The method of claim 26 further characterized in that the mixed metal carbonate calcite structure precipitate supported on an inert support material of step (5) is dried prior to the firing of step (6).

* * * * *